May 10, 1927.

D. F. BEAUCHAMP

ADJUSTABLE REFLECTOR

Filed Feb. 9, 1926

Inventor:
Dora F. Beauchamp
By Monroe E. Miller
Attorney.

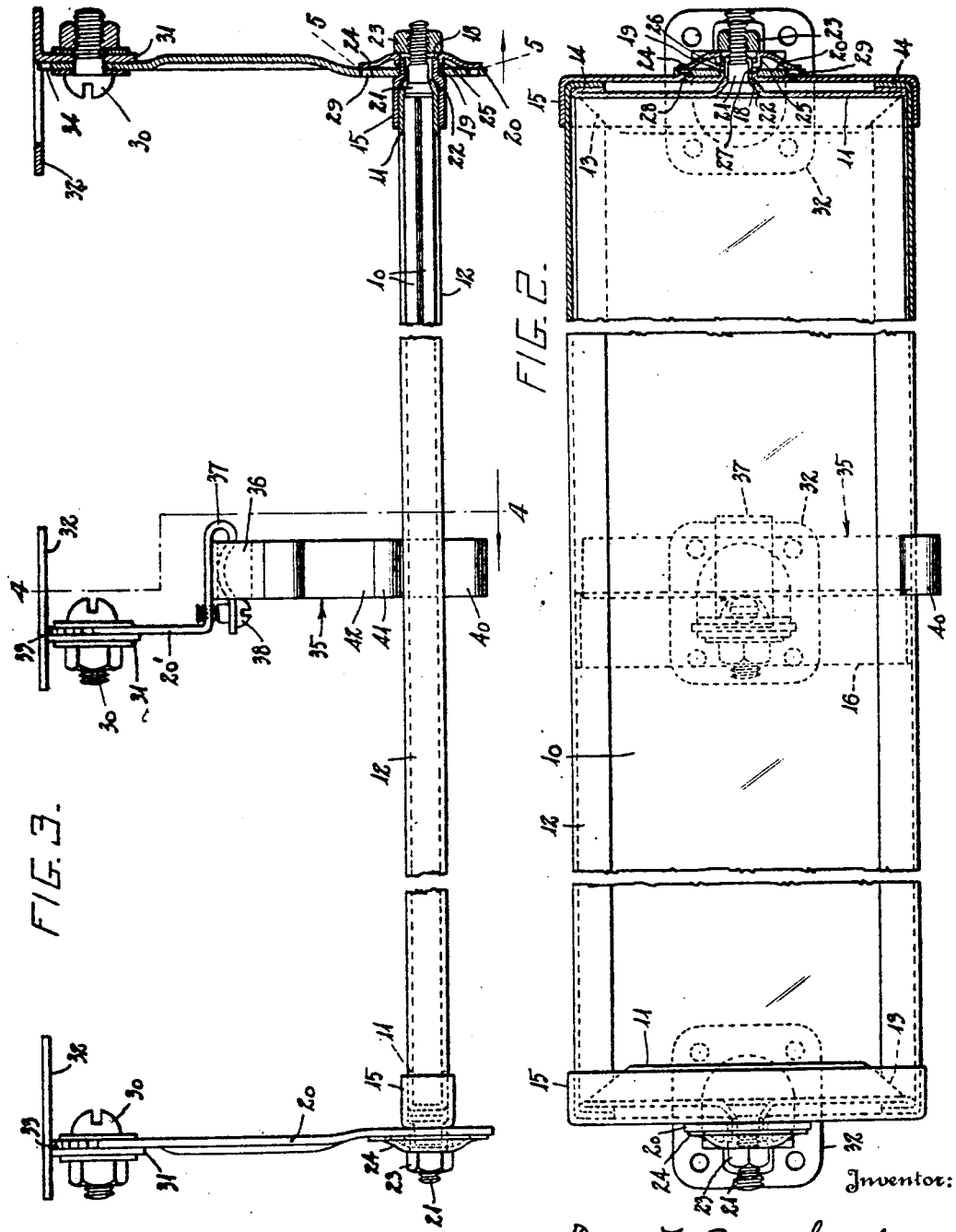

Patented May 10, 1927.

1,628,218

UNITED STATES PATENT OFFICE.

DORA F. BEAUCHAMP, OF FOREST HILLS, NEW YORK.

ADJUSTABLE REFLECTOR.

Application filed February 9, 1926. Serial No. 87,110.

The present invention relates to adjustable reflectors, especially those intended to be used for rear sight mirrors for automobiles and other vehicles, and this device is an improvement over the adjustable reflectors disclosed in my copending application Serial No. 701,106, filed March 22, 1924 (Patent No. 1,578,629, granted March 30, 1926).

It is an object of the invention to provide novel means for mounting a rear sight mirror or reflector in front of the operator of an automobile or other vehicle, in order that the mirror may be adjusted to different positions and angles, so that the operator of the vehicle can conveniently observe other vehicles in rear, the mirror also being reversible to present either brilliant or subdued reflecting surfaces, the latter being particularly desirable when the sunlight would produce objectionable glare in the eyes of the operator or when the headlamps of vehicles in rear give forth strong light.

Another object is the provision of novel means for mounting a reflector for adjustment to different positions and to different angles in its various positions, and, more specifically, for upward and downward adjustment and for turning movement about an axis transversely of the vehicle, when the device is used as a rear sight mirror.

A further object is the provision of novel means for supporting and holding the intermediate portion of an elongated reflector and adjustable to correspond to the adjustments of the reflector.

A still further object is the provision of a novel frame for the reflector or mirror panel or panels, comprising a novel assemblage of the component elements.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawings, wherein—

Fig. 2 is an enlarged front view of the device, portions being broken away and shown in section.

Fig. 3 is a top view, portions being broken away and shown in section.

Figure 1:
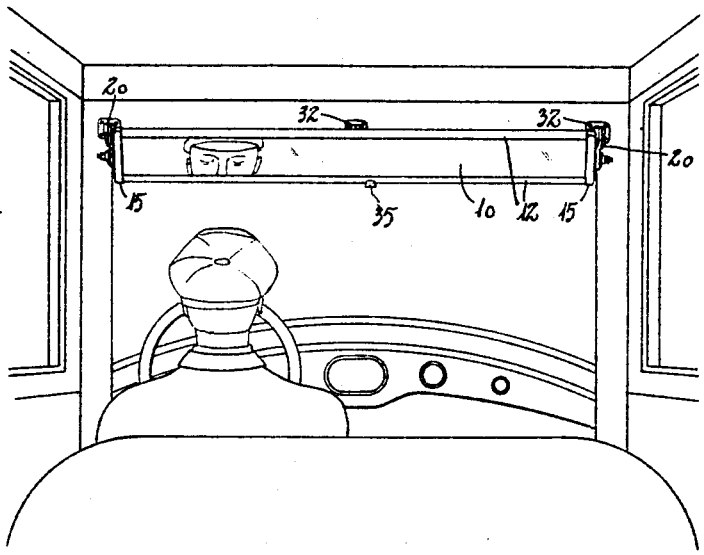
Figure 1 is a perspective view of the device used within a closed automobile.
Figure 6:
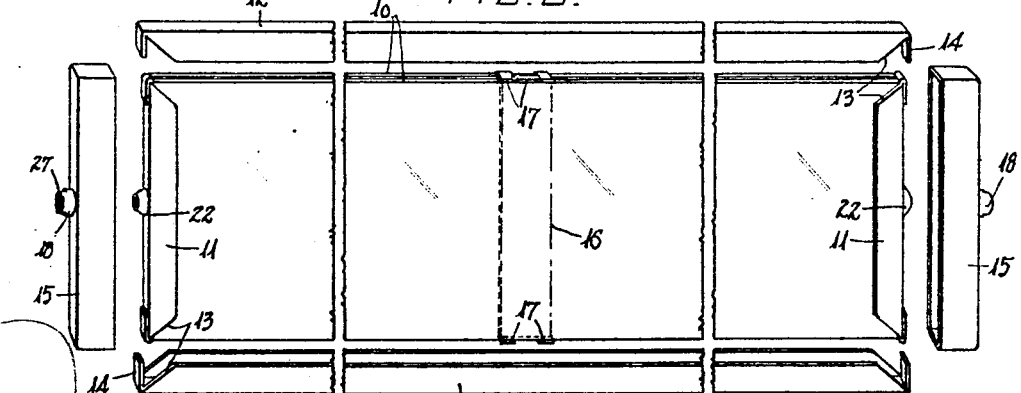
Fig. 6 is a perspective view showing the reflector frame with its several parts separated.

The reflector, as shown in Fig. 1, is used as a rear sight mirror for an automobile or other vehicle, although the device may be used for other purposes for which it is suitable. The reflector is elongated, being disposed transversely of the vehicle above or behind the upper portion of the windshield. The reflector or mirror is reversible, having opposite mirror or reflecting surfaces, and the reflector proper comprises the opposite panels or plates 10 of glass or other transparent material disposed back to back, with their inner surfaces coated with silver, mercury, or other material to provide the reflecting surfaces. One panel or plate has a highly polished or brilliant reflecting surface, while the other panel has a dull or subdued reflecting surface to be used to avoid glare from strong sunlight or head lights.

The reflector frame comprises end or cross members 11 and longitudinal members 12, which are composed of sheet metal and of channel shape so as to fit astride the ends and edges, respectively, of the panels or plates 10. The ends of the members 11 and 12 are bevelled, as at 13, to provide mitre joints, and the ends of the members 12 have angularly extending ears or portions 14 to overlap the members 11 and hold said members 11 in place on the ends of the panels, the members 11 being fitted on the ends of the panels before the members 12 are applied. Elongated caps 15 of sheet metal are fitted over the members 11 and terminals of the members 12, to enclose said members 11 and conceal the joints, so as to provide a neat finish for the ends of the reflector, and the caps 15 also hold the members 12 on the panels, thus providing a simple and efficient assembly of the parts of the reflector frame. The parts are readily assembled and separated, and when one of the panels 10 is accidentally broken, it may be readily replaced.

The reflector, especially if comparatively long, as seen in Fig. 1, is strengthened at one or more intermediate points by means of a stay strip 16 extending between the panels 10 from edge to edge and having its ends split and bent toward opposite sides, as at 17, to overlap the edges of the panels within the longitudinal channel members 12. One of the stays 16 may be used midway between the ends of the reflector, or two or more of them may be distributed throughout the length of the reflector.

In order to mount the reflector for rotary adjustment about its longitudinal axis, the caps 15 have outstanding bosses or trunnions 18 between their ends extending through and rotatable within apertures 19 in supporting arms 20 stamped from sheet metal. Clamping bolts 21 have countersunk heads seated in countersunk bosses 22 with which the end members 11 are formed between the ends thereof, and said bolts 21 extend outwardly through the bosses 18 and have nuts 23 threaded on their outer terminals. Dished sheet metal washers 24 having radial slits at their edges are disposed between the nuts 23 and arms 20 and constitute springs for frictionally holding the ends of the reflector frame against the arms 20. The spring washers or disks 24 are bowed away from the arms 20 with their edges bearing against said arms and the nuts 23 contacting with the central portions of said disks, and said disks have inwardly extending hubs 25 fitted slidably on the bosses 18. The hubs 25 are provided with inwardly extending lugs 26 engaging in slots or notches 27 with which the bosses 18 are provided, to prevent the disks 24 from rotating on the bosses 18 with reference to the reflector, and causing said spring disks to rotate with the reflector. The caps 15, which are of suitable sheet metal, are provided with lugs 28 struck outwardly therefrom to engage in annular series of apertures 29 with which the arms 20 are provided around the pivots or trunnions of the reflector provided by the studs or bosses 18. The lugs 28 engaging in the apertures 29 will frictionally hold the reflector in different positions relatively to the arms 20 when the reflector is turned around its longitudinal axis. When the reflector is turned relatively to the arms 20, the spring disks 24 permit the arms 20 to separate slightly from the caps 15 as the lugs 28 move out of the apertures 29.

The arms 20 are pivotally supported to enable the reflector to be adjusted bodily, upwardly and downwardly, as shown. Thus, the reflector is pivotally connected with the arms 20 near one end thereof, and the opposite ends of the arms are pivotally connected by pivot and clamping bolts 30 with ears 31 struck from sheet metal plates 32 that are fastened by screws or other securing means to the supporting member from which the reflector is mounted. As shown, the plates 32 are secured to the lintel of the automobile body above the windshield, when the bolts or elements 30 are loosed, the arms 20 may be swung upwardly and downwardly about the horizontal transverse axis of the bolts 30, for raising and lowering the reflector, and when the bolts 30 are tightened, the arms 20 are maintained in their desired angular position. To prevent accidental loosening of the arms 20, they are provided with notches 33 surrounding the bolts 30 to engage lugs or pins 34 carried by the ears 31 in the different positions of the arms. Thus, to adjust the arms 20, the bolts 30 are loosened so that the arms may be disengaged from the lugs 34, thereby permitting the arms to be swung around the bolts or pivots 30.

Figure 4:
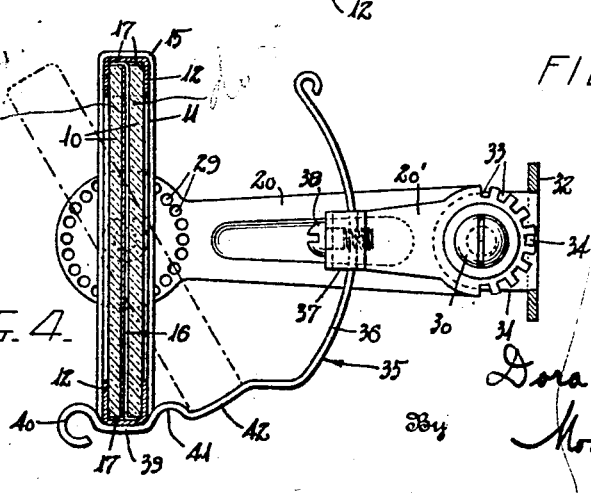
Fig. 4 is a cross section on the line 4—4 of Fig. 3.
Figure 5:
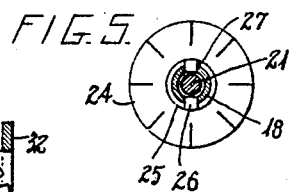
Fig. 5 is a sectional detail taken on the line 5—5 of Fig. 3.

An intermediate support and holder for the reflector is used, especially when the reflector is of comparatively long length, as seen in Fig. 1. The intermediate support comprises a short arm 20' pivotally connected with the ear 31 of a supporting plate 32, the same as the arms 20, and a leaf spring 35 is carried by the arm 20' to engage the lower edge portion of the reflector. The spring 35 has the arcuate portion 36 curved around the longitudinal axis of the reflector as a center, and the portion 36 is slidable longitudinally thereof in an angularly extending doubled portion 37 of the arm 20'. A clamping screw 38 engages through the doubled portion 37 opposite to the bend thereof, to clamp the portion 36 in the loop or doubled portion 37 of the arm 20'. The free portion of the spring 35 has a seat 39 in which the lower longitudinal member 12 of the reflector frame is engageable to support the intermediate portion of the reflector against sagging movement and to also assist in holding the reflector in the desired angular position. The free end of the spring 35 has an eye or loop 40 beyond the seat 39, and the spring has an offset portion 41, so that the lower portion of the reflector is held frictionally between the eye 40 and portion 41. As shown, the spring 35 has another seat 42 for the lower edge portion of the reflector located nearer to the arm 20' than the seat 39, in order that the reflector may be conveniently positioned in two different angles, as seen in full and broken lines in Fig. 4. The free terminal of the spring 35 may be readily sprung downwardly away from the reflector, to permit the reflector to be turned or reversed. The arm 20' is adjusted with the arms 20 to the same position, in order that the portion 36 of the spring 35 is concentric with the axis of the reflector. Therefore, when loosening the screw 38 the spring 35 may be adjusted around the axis of the reflector in order that the seat 39 may be positioned to maintain the reflector in the desired angular position with reference to the arms 20. The spring 35 not only assists in holding the reflector in the desired angular position about its axis, but also supports the intermediate portion of the reflector against downward vibration or sagging as might be injurious to the reflector if it occurred.

As seen in Fig. 1, the reflector may be of a length to extend transversely substantially the full width of the vehicle body, in order that traffic in rear and at the opposite sides may be observed by the driver. The reflector may be raised and lowered to different vertical positions by the adjustment of the arms 20, and in its different vertical positions the reflector may be turned on its axis to provide for convenient rear sight vision. The reflector may also be made in shorter lengths, and when the reflector is of short length the intermediate supporting and holding means for the reflector may be omitted. The reflector may be conveniently reversed to present either the brilliant or subdued reflecting surfaces into position for rear sight vision, and the dull or subdued reflecting surface is especially desirable to avoid the blinding glare from strong sunlight or headlights in rear of the vehicle.

When the parts of the reflector frame and arms 20 are assembled, they are held together against accidental separation. Thus, it will be noted that the longitudinal frame members 12 hold the end members 11 on the panels 10, and the caps 15 hold the longitudinal members on the panels. The clamping and spring means constituting the bolts 21, nuts 23, and spring disks 24 are connected to the end members 11 and bear against the arms 20, for holding the caps 15 and arms 20 together, and the caps 15 are thereby prevented from being removed from the members 12 and panels 10, it being noted that the bolts 21 are anchored or connected to the members 11 which are held in place by the longitudinal members 12, and that the caps 15, arms 20 and spring disks 24 are retained in place by the nuts 23 on the bolts 21. The bolts 21 and their nuts 23 not only hold the reflector and arms 20 together, but also hold the caps 15 in place by connecting them with the end members 11, so as to hold the parts of the reflector frame assembled.

Having thus described the invention, what is claimed as new is:—

1. A device of the character described comprising an elongated reflecting panel, an end member fitting one end of the panel, longitudinal members fitting the edges of said panel and engaging said end member to hold it in place against the end of said panel, a cap fitted over said end member and ends of the longitudinal members, and a supporting member connected to said end member and retaining said cap in place.

2. A device of the character described comprising an elongated reflecting panel, an end and two longitudinal channel members fitting astride one end and the edges of the panel respectively and having mitre joints, the longitudinal members having portions at their ends overlapping the end member and holding it on the end of the panel, an elongated cap fitted over the end member and ends of the longitudinal members, and a supporting member connected to said member.

3. A device of the character described comprising elongated reflecting panels disposed back to back, a frame for said panels including longitudinal channel members fitting astride the edges of the panels, a stay strip between the panels having portions at its ends overlapping the edges of the panels within said members, and supporting means connected to the ends of said frame.

4. A device of the character described comprising an elongated reflecting panel, an end member fitting one end of said panel, longitudinal members fitting the edges of said panel and engaging said end member to hold it in place against the end of said panel, a cap fitted over said end member and the ends of the longitudinal members, a supporting member beyond said end of said panel, and a pivot element connecting said end member and supporting member between said longitudinal members.

5. A device of the character described comprising two elongated reflecting panels disposed back to back, end members fitting the ends of said panels, longitudinal members fitting the edges of said panels and engaging said end members to hold them in place against the ends of said panels, caps fitted over said end members and the ends of the longitudinal members, arms beyond the ends of said panels, pivot elements connecting said end members and arms, and means for supporting said arms for swinging adjustment to different angular positions.

6. A device of the character described comprising two adjustable arms, a reflector carried by said arms, a third arm intermediate the aforesaid arms and adjustable similarly thereto, and means carried by the third arm to engage the lower edge portion of the reflector intermediate the ends thereof.

7. A device of the character described comprising two pivotally supported arms, a reflector between and carried by said arms, a third pivotally supported arm between the aforesaid arms and adjustable similarly thereto, and means carried by said third arm to engage under the lower edge of the reflector between the ends thereof.

8. A device of the character described comprising two arms, a reflector between and pivotally connected with said arms for turning adjustment about an axis, a third arm between the aforesaid arms, and a leaf spring having a portion to engage under the lower edge of the reflector and having a portion engaging the third arm for adjustment about said axis.

9. A device of the character described comprising two pivotally supported arms, a reflector between and pivotally connected with said arms for turning adjustment about an axis, a third arm pivotally supported between and adjustable similarly to the aforesaid arms, and a leaf spring having a portion to engage under the lower edge of the reflector between the ends thereof and having a curved portion to be disposed concentric with said axis, the third arm having means for receiving and clamping said curved portion of the spring.

10. A device of the character described comprising two pivotally supported arms, a reflector between and pivotally connected with said arms, a third arm pivotally supported between and adjustable similarly to said arms and having an angularly extending doubled portion provided with a clamping screw, and a leaf spring having a portion to engage under the lower edge of the reflector between the first named arms and having a curved portion to be disposed concentric with the axis of the reflector and extending through said doubled portion for adjustment around said axis and to be clamped in said doubled portion.

11. A device of the character described comprising a reflector mounted for turning adjustment about an axis, a leaf spring having a portion to engage said reflector and having a curved portion to be disposed concentric with said axis, and means for receiving and clamping said curved portion of the spring and permitting adjustment thereof about said axis.

12. A device of the character described comprising a reflector mounted for rotary adjustment about an axis, a leaf spring having a portion to engage said reflector and having a curved portion to be arranged concentric with said axis, clamping means receiving said curved portion for the adjustment thereof about said axis, and means for mounting said clamping means for adjustment to position said curved portion of the spring concentric with said axis.

13. A device of the character described comprising supporting arms, an elongated reflecting panel between said arms, end and longitudinal members fitting the ends and edges of the panel, respectively, the ends of the longitudinal members having portions engaging the end members to hold said end members in place against the ends of the panel, caps fitted over said end members and the ends of the longitudinal members to hold said longitudinal members in place, said caps being pivotally connected to said arms, and clamping and spring means connected to said end members and bearing against said arms to create friction between the caps and arms.

14. A device of the character described comprising supporting arms, an elongated reflecting panel between said arms, end and longitudinal members fitting the ends and edges of the panel, respectively, the ends of the longitudinal members having portions engaging the end members to hold said end members in place, caps fitted over said end members and ends of the longitudinal members and holding said longitudinal members in place, the caps having bosses mounted for rotation in said arms, bolts connected to said end members and extending through said bosses, and spring means between said arms and bolts for creating friction between said caps and arms.

15. A device of the character described comprising supporting arms, an elongated reflecting panel between said arms, end and longitudinal members fitting the ends and edges of the panel, respectively, the ends of the longitudinal members having portions engaging the end members to hold said end members in place, caps fitted over said end members and ends of the longitudinal members and holding said longitudinal members in place, the caps having bosses mounted for rotation in said arms, bolts connected to said end members and extending through said bosses, nuts threaded on said bolts, and spring members between said nuts and arms.

16. A device of the character described comprising supporting arms, an elongated reflecting panel between said arms, end and longitudinal members fitting the ends and edges of the panel, respectively, the ends of the longitudinal members having portions engaging the end members to hold said end members in place, caps fitted over said end members and ends of the longitudinal members and holding said longitudinal members in place, the caps having bosses mounted for rotation in said arms, bolts connected to said end members and extending through said bosses, nuts threaded on said bolts, and spring disks between said nuts and arms slidable on said bosses.

17. A device of the character described comprising supporting arms, an elongated reflecting panel between said arms, end and longitudinal members fitting the ends and edges of the panel, respectively, the ends of the longitudinal members having portions engaging the end members to hold said end members in place, caps fitted over said end members and ends of the longitudinal members and holding said longitudinal members in place, the caps having bosses mounted for rotation in said arms, bolts connected to said end members and extending through said bosses, nuts threaded on said bolts, and dished spring disks between said nuts and arms having hubs slidable on said bosses, said bosses having notches and the hubs having lugs in said notches to rotate said disks with the bosses.

In testimony whereof I hereunto affix my signature.

DORA F. BEAUCHAMP.